July 21, 1970 J. C. MILLER ET AL 3,521,268

DATA CONVERSION AND DISPLAY APPARATUS

Filed Oct. 17, 1966 2 Sheets-Sheet 1

Inventors:
JAMES C. MILLER &
CHARLES M. WINE
By John V. Regan
Attorney

DATA CONVERSION AND DISPLAY APPARATUS

Filed Oct. 17, 1966 2 Sheets-Sheet 2

OUTPUT CIRCUIT WIRING TABLE

| A | B | C | D | E | F | G | H | I |
|---|---|---|---|---|---|---|---|---|
| 1 | 2 | 3 | 4 | 5 | 6 | 7 | 8 | 9 |
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |

RING COUNTER WIRING TABLE

| R1 | R2 | R3 | R4 | R5 |
|---|---|---|---|---|
| 1 | 10 | 19 | 28 | 37 |
| 2 | 11 | 20 | 29 | 38 |
| 3 | 12 | 21 | 30 | 39 |
| 4 | 13 | 22 | 31 | 40 |
| 5 | 14 | 23 | 32 | 41 |
| 6 | 15 | 24 | 33 | 42 |
| 7 | 16 | 25 | 34 | 43 |
| 8 | 17 | 26 | 35 | 44 |
| 9 | 18 | 27 | 36 | 45 |

Inventors:
JAMES C. MILLER &
CHARLES M. WINE
BY John V. Regan
Attorney

United States Patent Office 3,521,268
Patented July 21, 1970

3,521,268

DATA CONVERSION AND DISPLAY APPARATUS

James C. Miller, Pennington, and Charles M. Wine, Princeton, N.J., assignors to RCA Corporation, a corporation of Delaware Filed Oct. 17, 1966, Ser. No. 587,246
Int. Cl. G09f *9/30;* H03k *13/247*
U.S. Cl. 340—324 10 Claims

ABSTRACT OF THE DISCLOSURE

A data handling system having a core matrix addressed by a coded signal to repetitively switch a selected core. Signals developed from the core switching are summed with concurrent sequential display energizing signals to provide a display actuating signal which is routed on grouped sensing wires to a respective display producing means for forming successive display elements.

The present invention relates to a data signal handling system. More specifically, the present invention relates to a data conversion and display apparatus.

In the field of computing and data handling, it is often necessary to provide a display of data being handled in a form which is readily usable by a human operator. Usually, this involves the necessity of translating from machine language to ordinary characters, e.g., binary code to an alphanumeric display. Further, it is often desirable to provide a permanent record of the data being translated and handled.

An object of the present invention is to provide an improved data conversion and display system.

Another object of the present invention is to provide an improved display character generator controllable directly by computer language signals.

A further object of the present invention is to provide an improved data conversion and display system having a magnetic core matrix for the conversion of data from one code to another code.

In accomplishing these and other objects, there has been presented, in accordance with the present invention, a signal translating and display system having a magnetic core matrix and address means for repetitively selecting and resetting a particular core in the matrix. The core matrix is arranged to have a plurality of wires threading each core in addition to the wires used by the address means to select a desired core. These additional wires are selectively energized by a ring counter and are connected to a display device arranged to provide character displays. Each display character comprises a set of display elements which are selected by the wires threading a core selected by the address means.

A better understanding of the present invention may be had when the following detailed description is read in connection with the accompanying drawings, in which.

Figures 1, 3:
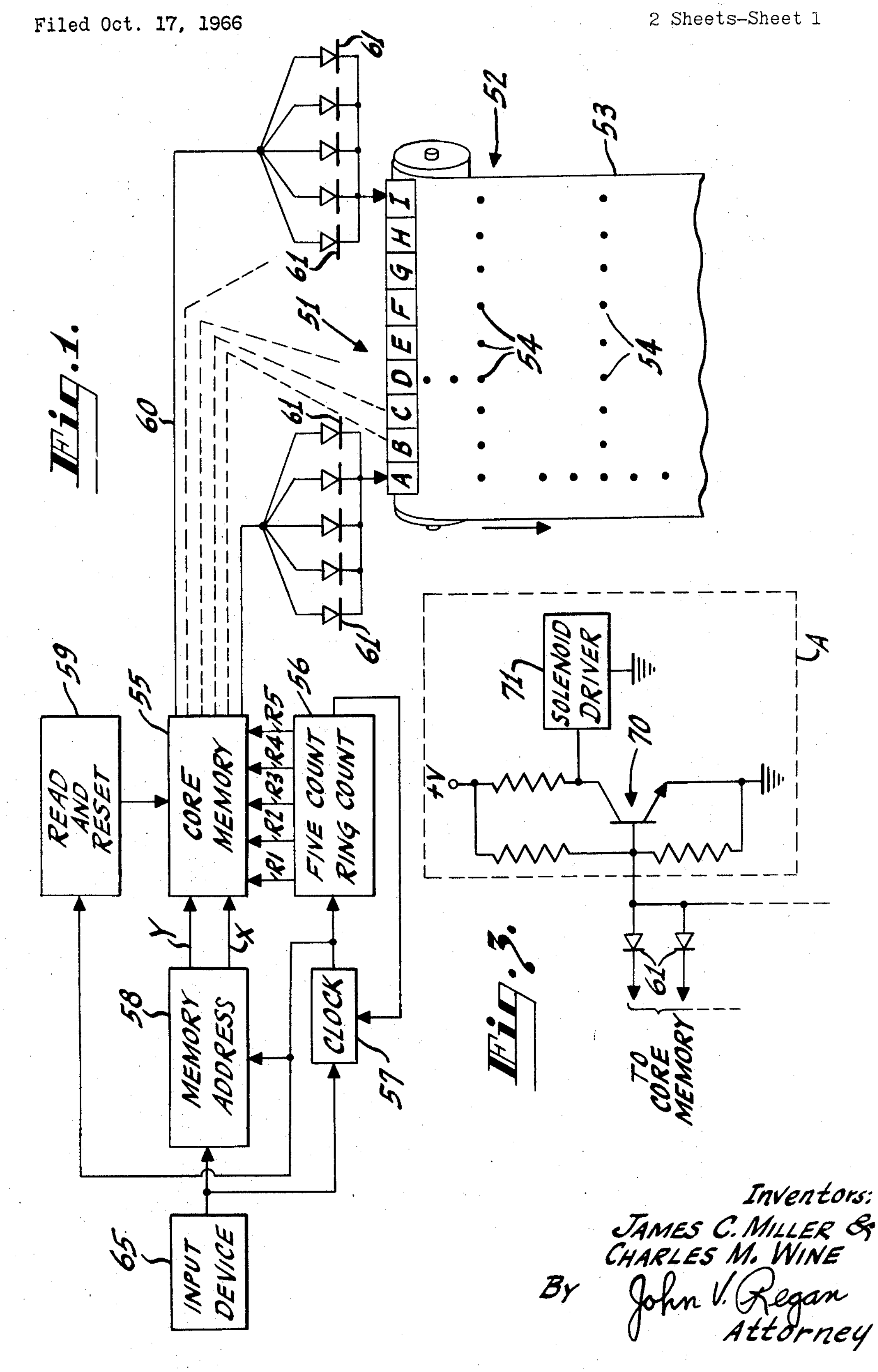
FIG. 1 is a block diagram of a data signal translating and display system embodying the present invention.
FIG. 3 is a schematic of a typical printer solenoid drive circuit suitable for use with the system shown in FIG. 1.

Referring to FIG. 1 in more detail, there is shown a data signal translating system embodying the present invention and illustratively arranged to provide energizing signals for operating the solenoid circuits 51 of a printer mechanism 52. The solenoid circuits 51 may include silicon-controlled rectifier, i.e. SCR, devices to supply power to printing solenoids with the aforesaid energized signals being connected to the trigger elements of respective SCR's. The printer 52 is arranged to print characters on a record medium 53. These characters are formed from selectively printed dots 54. The dots 54 are selected from a character forming matrix comprising, in the illustrated embodiment, nine vertical columns of dots and five horizontal rows at the printer 52. Thus each character is printed on the document 53 by selecting the appropriate dots from the nine-by-five dot matrix.

The printer 52 shown in FIG. 1 is arranged to print on a moving tape medium 53 to produce a single line of printing, such as a stock market tape printer. Alternatively, the solenoid circuits 51 may be used in a page printing mechanism, such as the apparatus shown in the patent of Charles J. Young, issued on May 2, 1967 and having No. 3,317,017. In either application, the solenoid circuits 51 are selectively energized to produce characters from a suitable dot matrix, such as a five-by-nine dot matrix.

Figure 2:
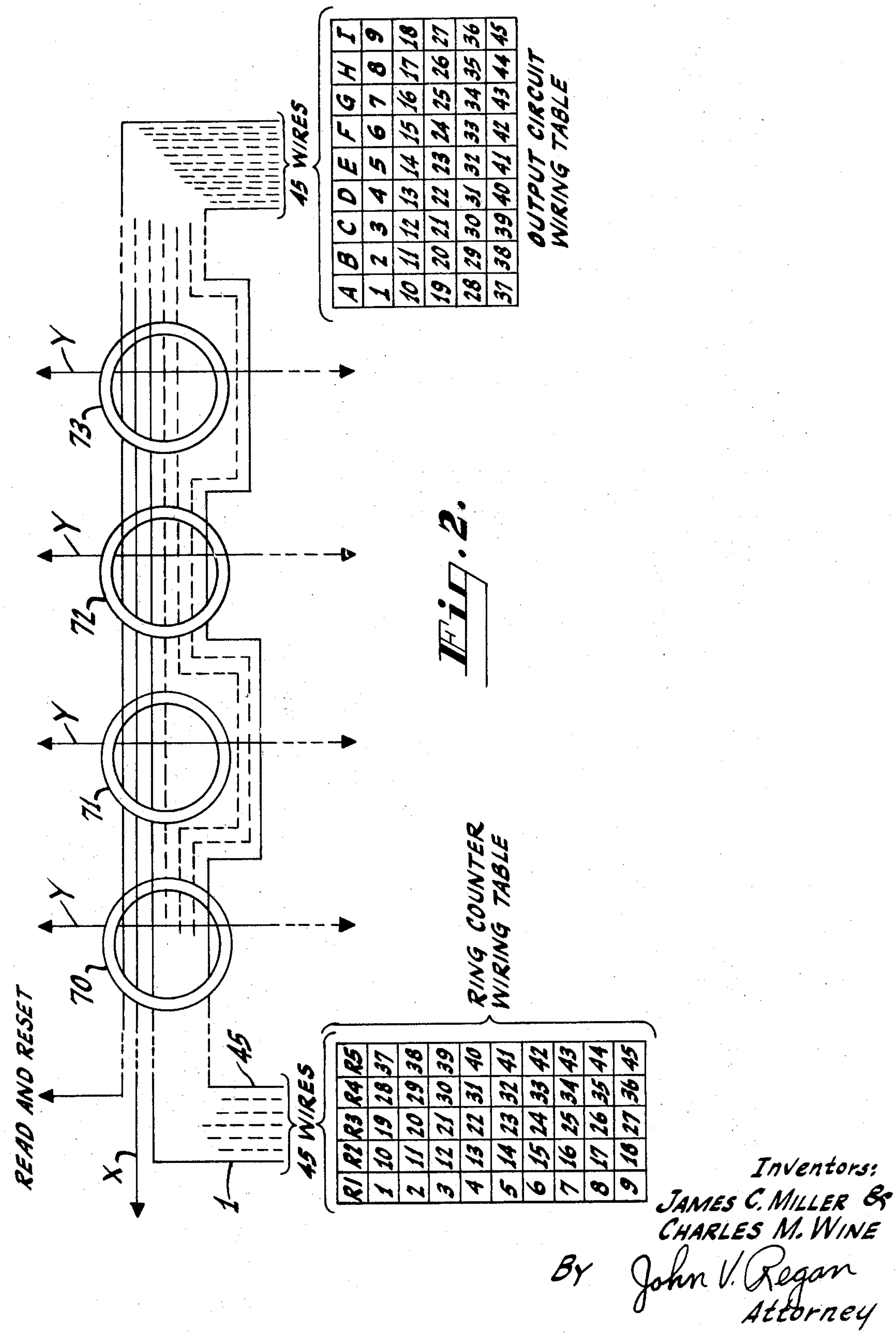
FIG. 2 is a simplified pictorial illustration of a core matrix suitable for use with the system shown in FIG. 1.

The amplitude of each of the selective energizing signals for the solenoid circuits 51 has two components. One component is obtained in part from sensed output signals from a character memory 55 having square-loop hysteresis memory cores arranged as shown in FIG. 2 and discussed more fully hereinafter. The second component of the energizing signal is obtained from an output signal from a five stage ring counter 56, whose outputs are also coupled to lines threading the memory cores in a manner later described. The ring counter 56 is driven by signals of a suitable predetermined frequency from a clock means 57. A memory address circuit 58 and "read and reset" circuit 59 are used to selectively switch or "read" the cores in the memory 55 for each character to determine the selection of the printer solenoid circuits 51. Such a memory address circuit may include an address register circuit for decoding and storing input selection signals and "X" and "Y" drivers which are selected by the contents of the register.

The drivers in one embodiment are arranged to provide saturating bias signals on "X" and "Y" lines in the memory 55 except for the drivers connected to the "X" and "Y" lines of the selected core. Thus, all the cores except the selected core would be held in a saturated state by having a least one driver supplying a bias signal thereto. The reading of the selected core is then achieved by a "read" signal from the read and reset means 59 applied to all the cores, which signal is ineffective to switch the biased cores. Each "read" signal is followed by a "reset" signal from the means 59 which "reset" signal only affects the switched selected core. The biasing drivers would be retained in the bias state during the printing of each character, while the read and reset means 59 would read and reset the selected core for five repetitive "reading" operations in response to the clock 57.

Since the cores in this illustrated system are destructively read to provide output signals to the printer solenoid circuits 51, the read and reset means 59 is provided to repetitively reset the selected character core during each cycle of operation to allow a repetitive switching by the memory address 58 of the selected core during the printing of the five rows of character dots. The core switching signals from the memory 55 are applied over output lines 60 to diodes 61 which diodes are arranged to pass only signals to the solenoid circuits 51 having a predetermined amplitude representative of a core output signal combined with an output signal from the counter 56. In other words, the diodes 61 are back-biased to permit an input signal having a predetermined amplitude to actuate the solenoid circuits 51. Thus, only an input signal formed from a sensed core output signal and a counter stage output signal is effective to operate a solenoid circuit. The clock 57 is initially triggered into a freerunning mode by a character selection input signal from an input device 65. After a count of five by the ring counter 56, an end-of-count signal from the counter 56 is arranged to shut-off the clock 57 until a new character is selected by the input device 65.

In operation, the system of the present invention is effective to print characters on the record surface 53 by selecting dots from a dot matrix to be printed by the printing solenoids 51. The characters, in turn, are selected by the memory address means 58 which is operated in accordance with an input signal from a suitable input source 65, e.g., a digital computer, keyboard, etc. The memory means 58 and "read and reset" means 59 are effective to repetitively select, i.e., five times, a core in the memory 55 corresponding to the desired character. This character is, then, printed on the record medium 53 by the subsequent sequential actuation of the printing means 51 and the relative movement of the record medium 53. The movement of the record medium 53 may either be synchronized with the signals from the clock 57 to advance the medium 53 for each row of dots or the input device 65 may be arranged to provide a character selection in synchronism with a constant speed operation of the record medium 53. The ring counter 56 is stepped through a count cycle by the clock 57 to operate the printing means in each of the five horizontal rows comprising a character.

The number of dots to be printed in each row is determined by the number of output wires in the character core selected by the memory address means 58 from the memory 55 during a cycle of the counter 56. For example, in the illustration of FIG. 1, the printer means 52 has finished printing the character "T" and is shown in the process of printing the second character "H." For this second character, the printer solenoid "D" will print one more dot, and, then, all the print means 51 will be actuated to print another nine dots to complete the character. In summary, the cycle of operation includes a repetitive selection of the character core in the memory 55 and a concurrent stepping of the counter 56 through its five stages to actuate the print means 51 for each of the five rows of printing dots.

In FIG. 2, there is shown a simplified pictorial illustration of the wiring arrangement of the core memory 55. Four cores 70, 71, 72 and 73 have been shown to illustrate the cores found in the memory 55. The "X" and "Y" core selection wires are driven by the memory address means 58 to place the unselected character cores in a "biased" condition. The number of cores in the actual memory would at least be equal to the number of characters available for display. The number of dots in the dot matrix used for printing each character determines the number of remaining wires passing through the core memory 55. The illustrated embodiment has a nine-by-five dot matrix resulting in forty-five dot selection wires routed through the memory 55.

These wires are driven as five separate groups by the individual stages of the ring counter 56 as shown in ring counter wiring table. For example, wires 1 through 9 are energized by a signal from the first stage of the counter 56. These forty-five wires are wired in the core memory 55 in a manner which will allow each core to select a printed character. For example, to print the character "H," the corresponding core would have all the wires 1 through 9 driven by stage R1 passing through it to drive all the solenoids A through I. Assume the cross-bar of the "H" is printed by solenoid means "E." The core corresponding to the H symbol core would, then, have wires 14, 23 and 32 from the R2, R3 and R4 groups passing through it. Finally, it would, also, have all the wires 37 to 45 passing through it from group R5. The output circuit wiring table shows the connections of the forty-five wires when they are arranged in nine sets with each set having five wires for connection to the diodes 61.

Since all the wires of each set energized by the active counter stage will have a signal applied thereon, the undesired ones of the solenoids A through I are prevented from being actuated by providing a back-bias signal on all of the diodes 61 which is effective to block the counter signal when it appears alone as an input signal to the diodes 61. However, if the wire coming from the core memory 55 has the counter signal plus a core output signal produced by a switching of the core by the memory address means 58, the increased amplitude produced by the core output signal is effective to overcome the diode bias and actuate the appropriate one of the printing means 51. A typical circuit for operating the solenoid circuits 51 is shown in FIG. 3. The diode 61 is arranged to provide an input signal to the base of a transistor 70. An output signal from the transistor 70 is arranged to trigger a solenoid driver 71.

It is to be noted that the display means shown in FIG. 1 may either be replaced by any other suitable means such as a cathode-ray display system or operated concurrently therewith. The signals on the output lines 60 in the cathode-ray display system could be used as unblanking signals for a system generating a standard raster pattern on tube face with portions of the raster being selected by the unblanking signals to form characters. It is to be further noted that additional cores may be supplied in the core memory 55 to provide selective energizing signals for other uses such as indexing the record medium 53, operating a color change mechanism for the printed dots, etc. These cores would be selected by the address means 58 and would operate at any point in the ring counter cycle instead of the dot printing apparatus.

Accordingly, it may be seen that there has been presented, in accordance with the present invention, a data signal display and conversion system for converting data signals from one code to another while providing a display of data being converted.

What is claimed is:

1. A data display system comprising a magnetic core matrix having a plurality of switchable storage cores corresponding in number to at least the number of characters to be displayed wherein each display character comprises a plurality of display elements selected from a maximum number of possible display elements, address means for selectively switching said cores between their stable states, display means having means for producing any number of said display elements up to said maximum number of possible elements, actuating means for said display means having a plurality of wires passing through each of said cores to sense a signal produced by the switching of any of said cores, with each core taking the number of wires corresponding to the number of display elements forming a respective character, and an energizing signal source arranged to selectively apply an energizing signal to ones of said wires concurrently with said signal produced by the switching of said cores with said wires being connected between said display means and said energizing signal source to apply an actuating signal to said display means which is the sum of said energizing signal and said signal produced by the switching of said cores.

2. A data display system as set forth in claim 1 wherein said energizing source includes a counter means having a plurality of counter stages, said wires being divided into groups equal in number to the number of counter stages with each group being energized by a respective counter stage, and said display means includes a plurality of display element forming means for producing respective groups of said display elements with said wires in each of said groups being connected to corresponding ones of said display element forming means.

3. A data display system as set forth in claim 2 wherein said address means includes means for repetitively switching a selected core for a number of times equal to the number of said counter stages, and means for resetting a switched core after each switching operation.

4. A data display system as set forth in claim 3 wherein said element forming means each include signal threshold means arranged to pass said actuating signal and to block said energizing signal and said signal sensed from said cores.

5. A data display system as set forth in claim 3 and including a clock means for concurrently timing the operation of said counter means and said address means to synchronize the switching of a core in said matrix with the production of an energizing signal.

6. A system comprising a magnetic core matrix having a plurality of cores, a plurality of output lines arranged to selectively thread said cores as sense lines, each different core being threaded by a different combination of said lines, address means for switching a selected one of said cores between its stable states to produce a core output signal on those of said output lines which thread the selected core and energizing means arranged to apply energizing signals to a preselected number of said output lines to sum with said core output signal concurrently appearing thereon.

7. A system as set forth in claim 6 wherein said output lines are grouped externally to said core matrix into a plurality of groups each having a predetermined combination of said output lines.

8. A system as set forth in claim 7 wherein said energizing means applies said energizing signals to said preselected number of said output lines in predetermined groups with each of said last-mentioned groups of said output lines including one output line from each of said first-mentioned groups.

9. A system as set forth in claim 8 wherein said energiizng means applies said energizing signals successively to said predetermined groups in a preselected sequence.

10. A system as set forth in claim 9 wherein said energizing means is a multiple stage counting means having an output line from each stage connected to a respective one of said predetermined groups of said output lines.

References Cited

UNITED STATES PATENTS

| | | | |
|---|---|---|---|
| 3,016,521 | 1/1962 | McGuigan. | |
| 3,249,923 | 5/1966 | Simshauser | 340—347 X |
| 3,434,844 | 3/1969 | Winston | 178—30 X |
| 2,878,313 | 3/1959 | Tolson et al. | 178—30 |
| 3,011,165 | 11/1961 | Angel et al. | 340—347 |
| 3,130,397 | 4/1964 | Simmons | 340—324 |

MAYNARD R. WILBUR, Primary Examiner

M. K. WOLENSKY, Assistant Examiner

U.S. Cl. X.R.

178—30; 340—347